US012563450B2

(12) United States Patent
Kim et al.

(10) Patent No.: US 12,563,450 B2
(45) Date of Patent: Feb. 24, 2026

(54) METHODS AND PROCEDURES FOR SUBNETWORK FORMATION ENABLING DEVICE CENTRIC COMPUTE RESOURCE AND NETWORK CONNECTIVITY RESOURCE SHARING

(71) Applicant: MEDIATEK INC., Hsinchu (TW)

(72) Inventors: Bong Ho Kim, San Jose, CA (US);
Doru Calin, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 17 days.

(21) Appl. No.: 18/616,419

(22) Filed: Mar. 26, 2024

(65) Prior Publication Data

US 2024/0340704 A1      Oct. 10, 2024

Related U.S. Application Data

(60) Provisional application No. 63/494,782, filed on Apr. 7, 2023.

(51) Int. Cl.
| | |
|---|---|
| *H04W 28/16* | (2009.01) |
| *H04L 61/2567* | (2022.01) |
| *H04L 67/567* | (2022.01) |
| *H04W 48/16* | (2009.01) |

(52) U.S. Cl.
CPC ......... *H04W 28/16* (2013.01); *H04L 61/2567* (2013.01); *H04L 67/567* (2022.05); *H04W 48/16* (2013.01)

(58) Field of Classification Search
None
See application file for complete search history.

(56) References Cited

U.S. PATENT DOCUMENTS

| | | | | |
|---|---|---|---|---|
| 11,888,648 B1 * | 1/2024 | Lu | ........................... | H04L 45/66 |
| 2014/0323056 A1 * | 10/2014 | Carbajal | ............... | H04W 76/11 |
| | | | | 455/67.11 |
| 2016/0198501 A1 * | 7/2016 | Verkaik | ................... | H04W 8/04 |
| | | | | 370/329 |
| 2017/0013508 A1 * | 1/2017 | Pallas | ................. | H04W 28/088 |
| 2018/0213580 A1 * | 7/2018 | Taskin | ................. | H04W 76/19 |
| 2021/0400537 A1 * | 12/2021 | Zhang | ..................... | H04L 47/28 |
| 2022/0191199 A1 * | 6/2022 | Sambi | ................... | H04W 8/087 |
| 2023/0319639 A1 * | 10/2023 | Yu | ......................... | H04L 45/586 |
| | | | | 370/235 |

FOREIGN PATENT DOCUMENTS

| | | | | | |
|---|---|---|---|---|---|
| KR | 20170029540 A | * | 3/2017 | ........... | H04L 12/462 |
| KR | 20220034699 A | * | 3/2022 | ........ | H04W 28/0289 |

* cited by examiner

*Primary Examiner* — Phyllis A Book
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The method may be performed by a device. In certain configurations, the device provides a distributed device cloud function (DDCF) for handling communication for the device with one or more neighboring devices in a network via underlying access technologies. The device obtains a network address from the network or from an AP. The DDCF is configured to allow dynamic sharing of compute resources and network connectivity resources of the device with the neighboring devices in the network.

21 Claims, 17 Drawing Sheets

400

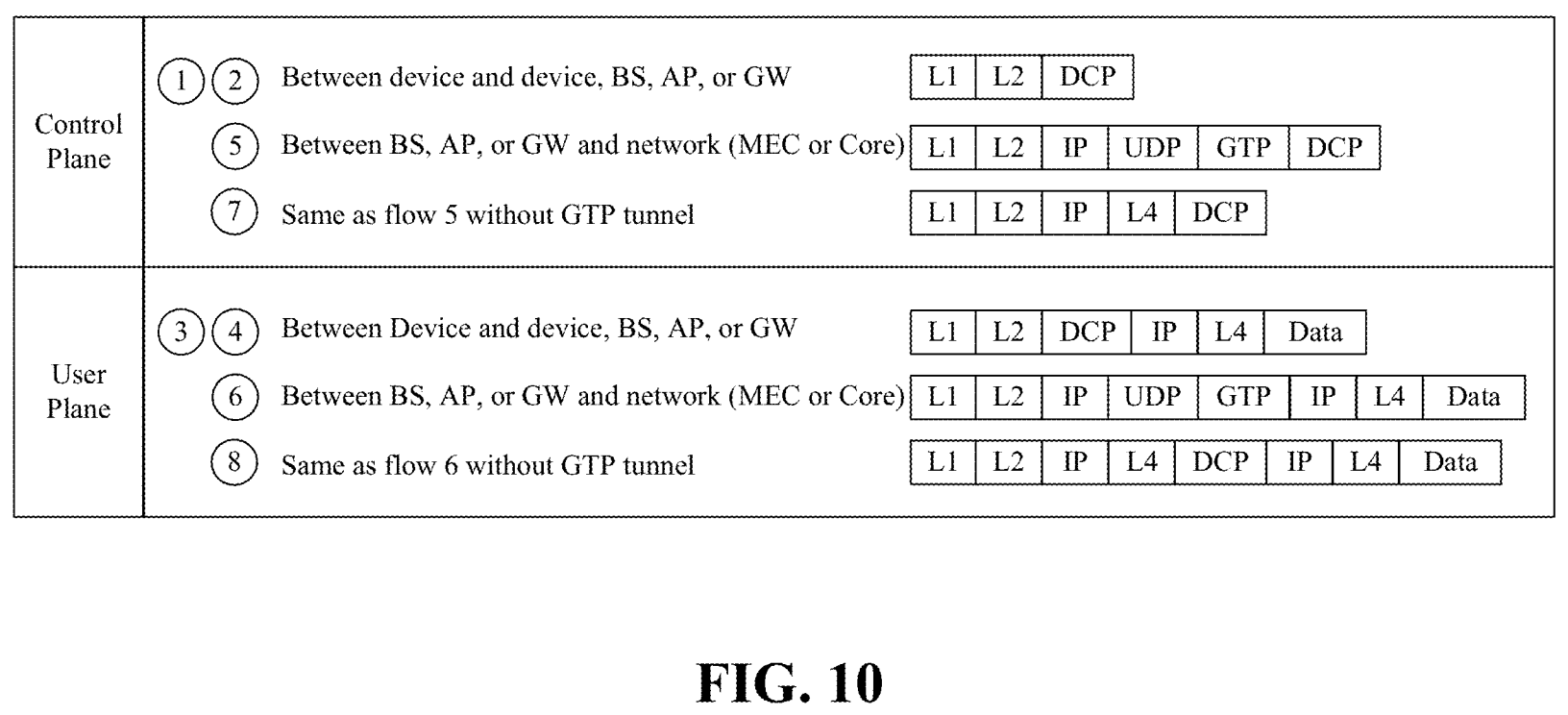

Control Plane

① ② Between device and device, BS, AP, or GW

| L1 | L2 | DCP |

⑤ Between BS, AP, or GW and network (MEC or Core)

| L1 | L2 | IP | UDP | GTP | DCP |

⑦ Same as flow 5 without GTP tunnel

| L1 | L2 | IP | L4 | DCP |

User Plane

③ ④ Between Device and device, BS, AP, or GW

| L1 | L2 | DCP | IP | L4 | Data |

⑥ Between BS, AP, or GW and network (MEC or Core)

| L1 | L2 | IP | UDP | GTP | IP | L4 | Data |

⑧ Same as flow 6 without GTP tunnel

| L1 | L2 | IP | L4 | DCP | IP | L4 | Data |

FIG. 10

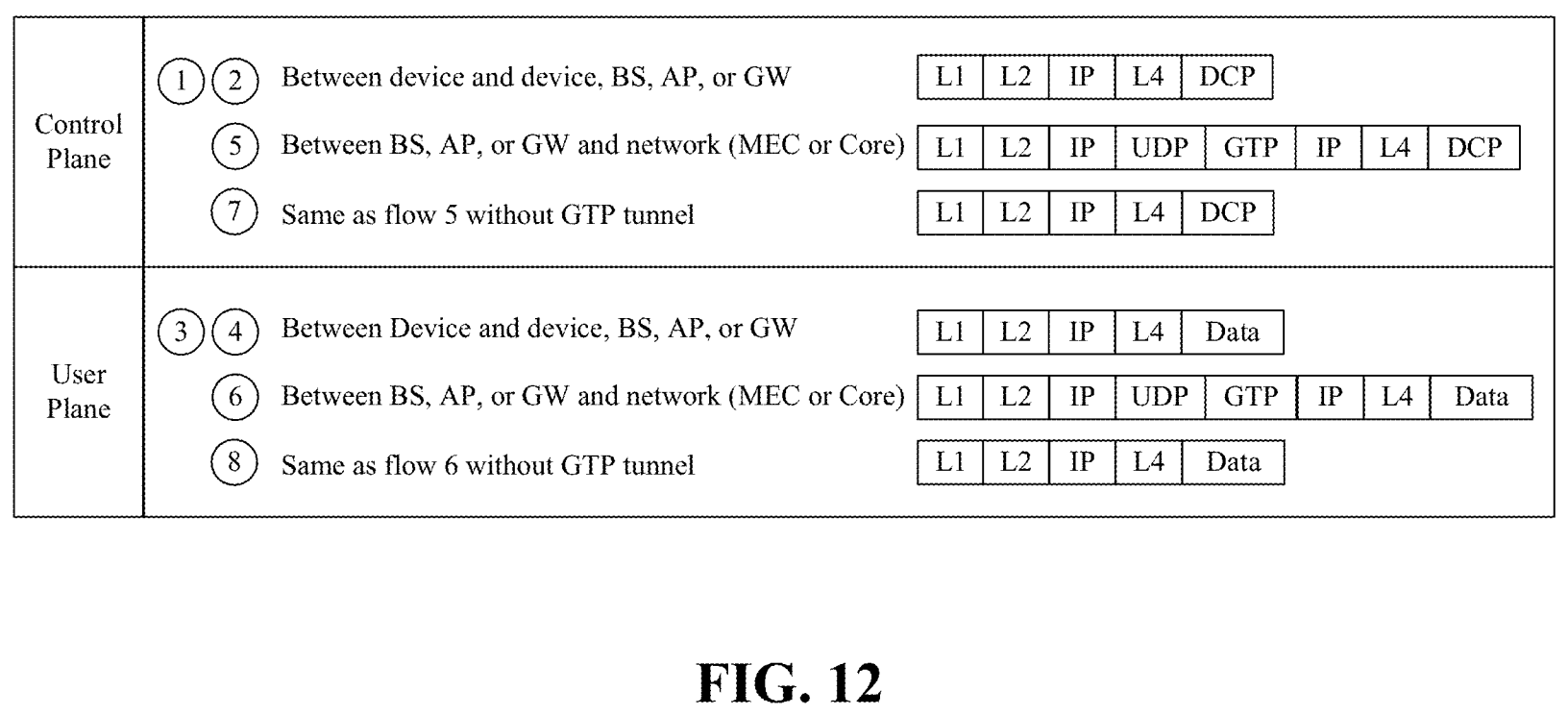

| | | | | |
|---|---|---|---|---|
| Control Plane | (1) (2) | Between device and device, BS, AP, or GW | | L1 \| L2 \| IP \| L4 \| DCP |
| | (5) | Between BS, AP, or GW and network (MEC or Core) | | L1 \| L2 \| IP \| UDP \| GTP \| IP \| L4 \| DCP |
| | (7) | Same as flow 5 without GTP tunnel | | L1 \| L2 \| IP \| L4 \| DCP |
| User Plane | (3) (4) | Between Device and device, BS, AP, or GW | | L1 \| L2 \| IP \| L4 \| Data |
| | (6) | Between BS, AP, or GW and network (MEC or Core) | | L1 \| L2 \| IP \| UDP \| GTP \| IP \| L4 \| Data |
| | (8) | Same as flow 6 without GTP tunnel | | L1 \| L2 \| IP \| L4 \| Data |

FIG. 12

1700 providing a DDCF for handling communication for the device with one or more neighboring devices in a network via underlying access technologies

1710 obtaining a network address from the network or from an access point (AP)

1720

METHODS AND PROCEDURES FOR SUBNETWORK FORMATION ENABLING DEVICE CENTRIC COMPUTE RESOURCE AND NETWORK CONNECTIVITY RESOURCE SHARING

CROSS-REFERENCE TO RELATED APPLICATION(S)

This application claims the benefits of U.S. Provisional Application Ser. No. 63/494,782, entitled "METHODS AND PROCEDURES FOR SUBNETWORK FORMATION ENABLING DEVICE CENTRIC COMPUTE RESOURCE AND NETWORK CONNECTIVITY RESOURCE SHARING" and filed on Apr. 7, 2023, which is expressly incorporated by reference herein in their entirety.

BACKGROUND

Field

The present disclosure relates generally to communication systems, and more particularly, to techniques of methods and procedures for subnetwork formation enabling device centric compute resource and network connectivity resource sharing.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a device. In certain configurations, the device provides a distributed device cloud function (DDCF) for handling communication for the device with one or more neighboring devices in a network via underlying access technologies. The device obtains a network address from the network or from an AP. The DDCF is configured to allow dynamic sharing of compute resources and network connectivity resources of the device with the neighboring devices in the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a diagram illustrating protocol headers of the exemplary traffic flows in FIG. 9.

FIG. 12 is a diagram illustrating protocol headers of the exemplary traffic flows in FIG. 11.

DETAILED DESCRIPTION

Figure 1:
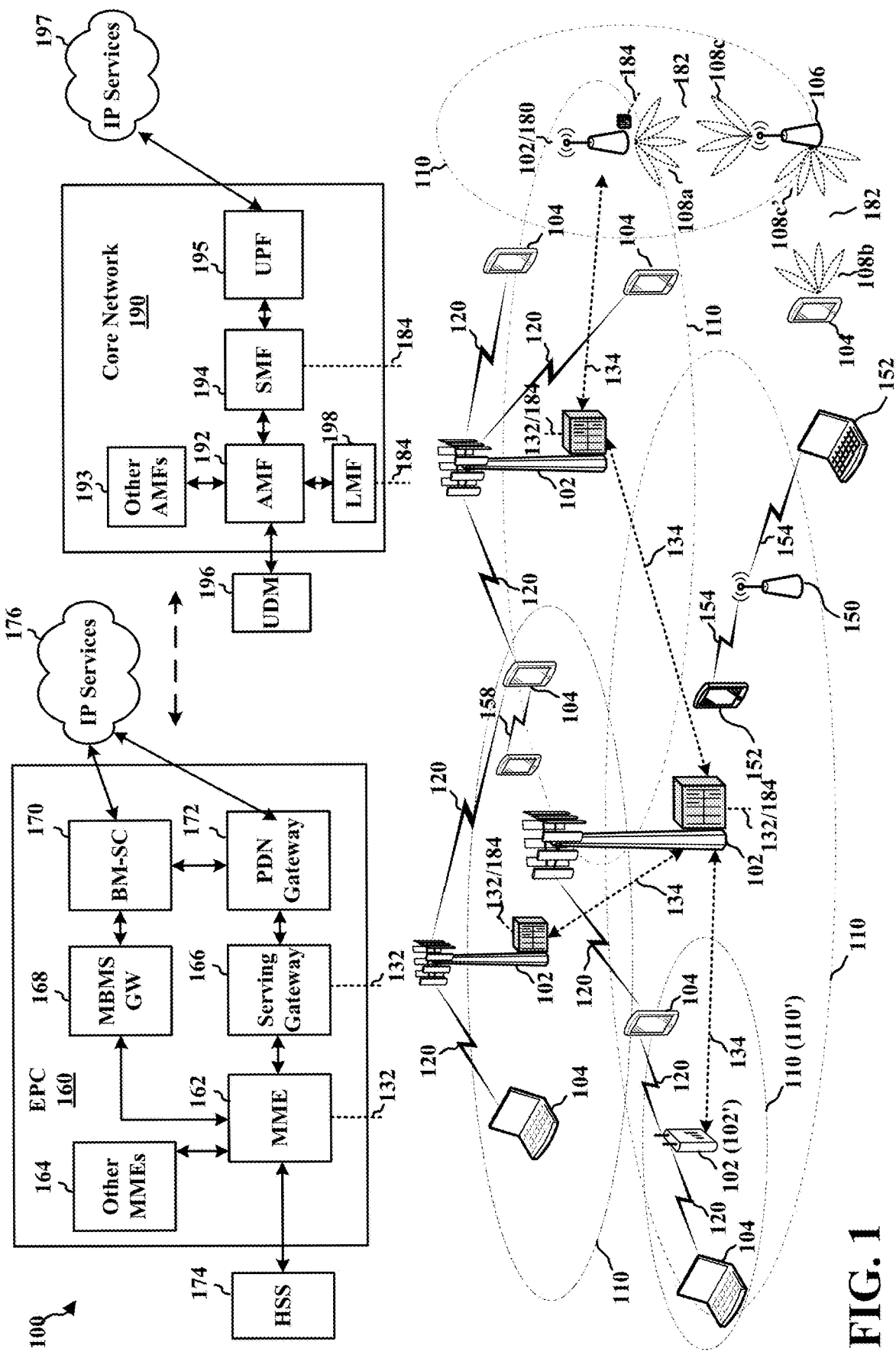
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
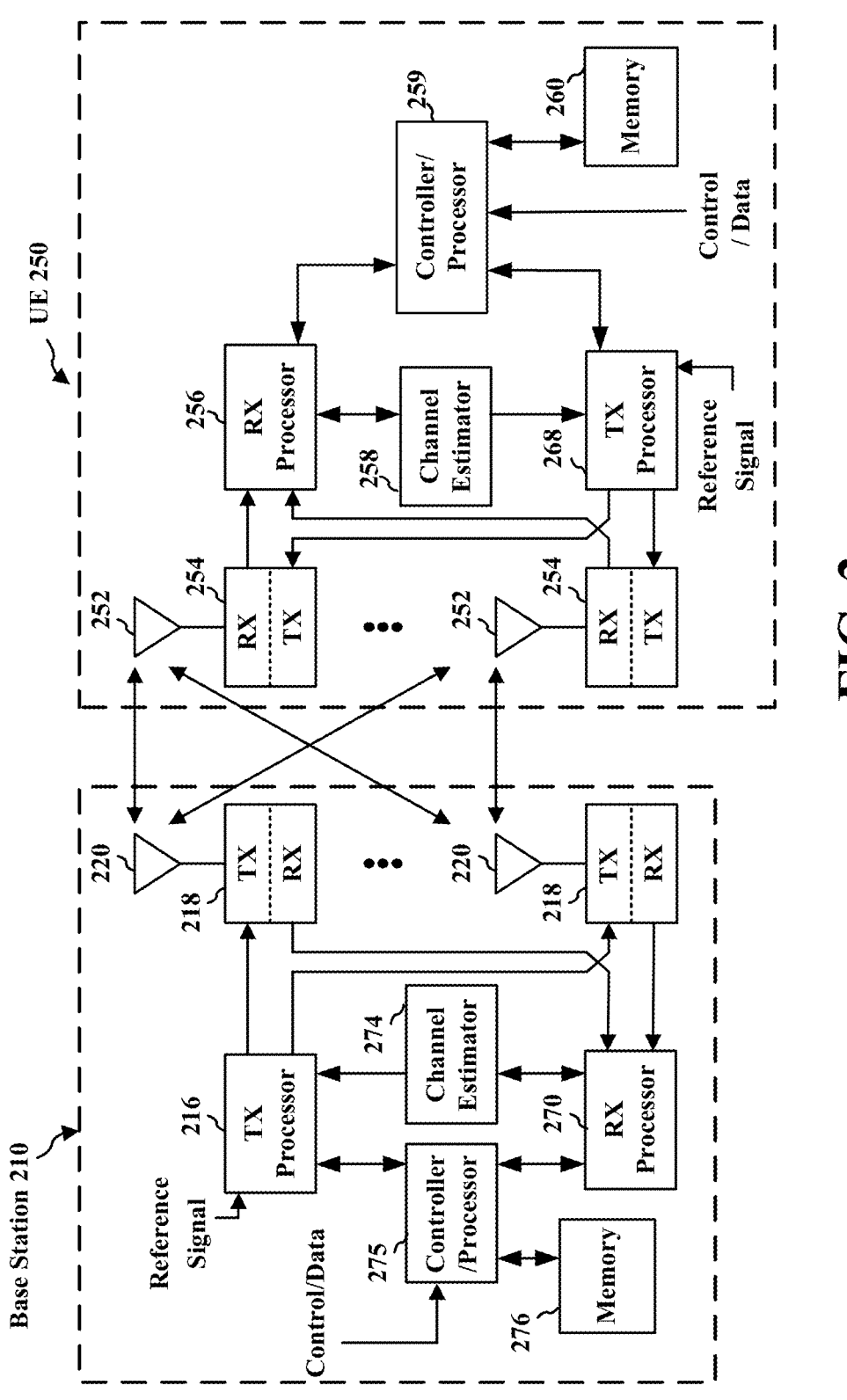
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
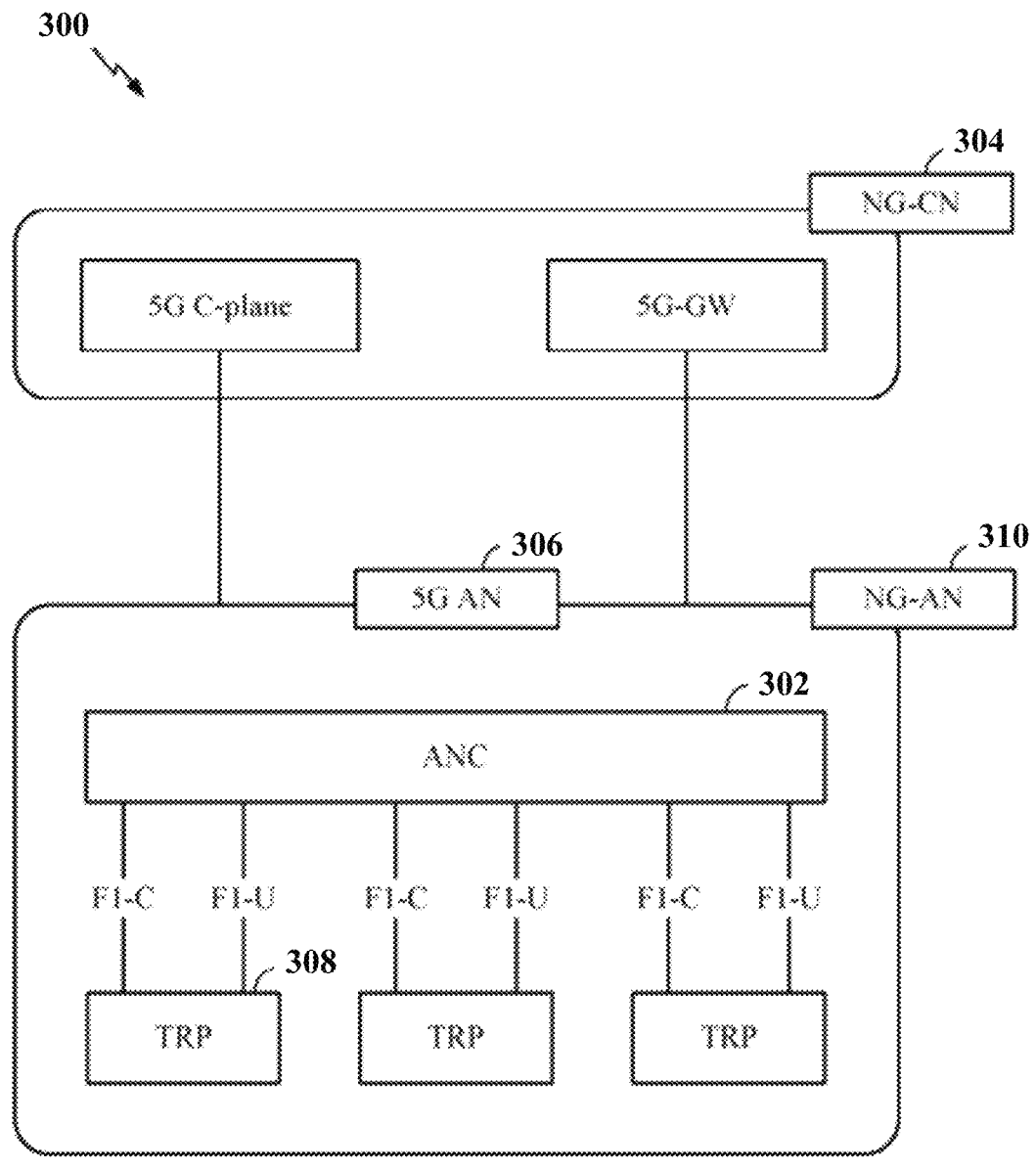
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
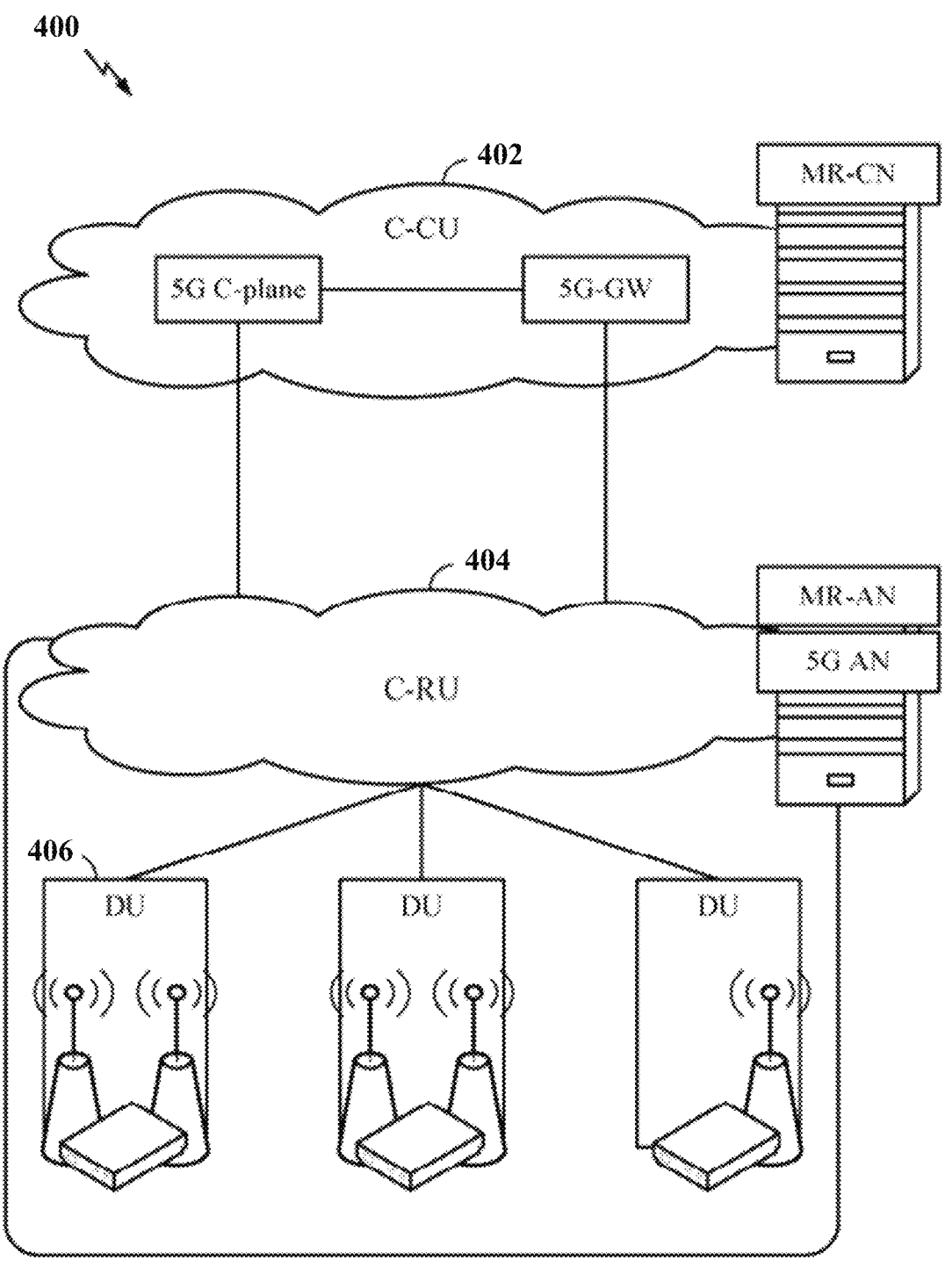
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
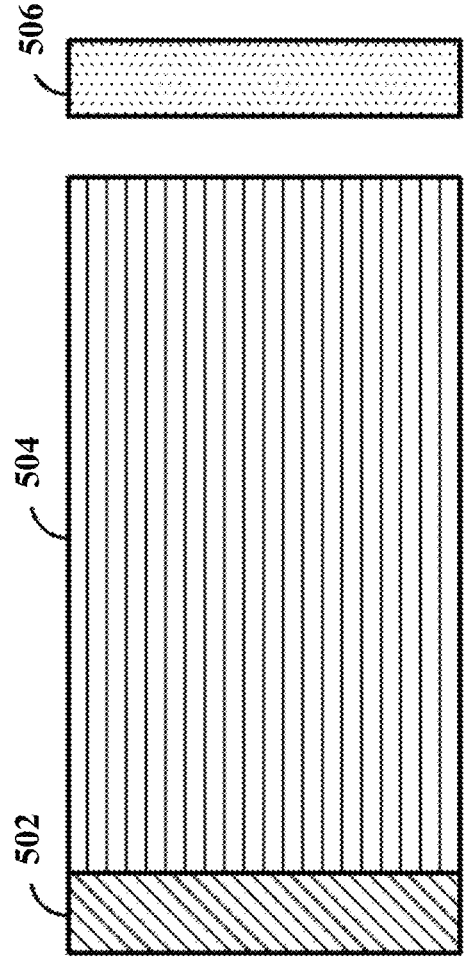
FIG. 5 is a diagram showing an example of a DL-centric slot.
Figure 5:
Figure 5:
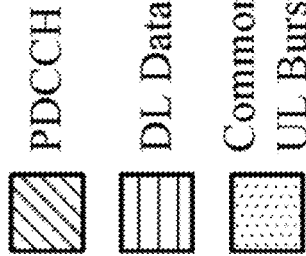

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
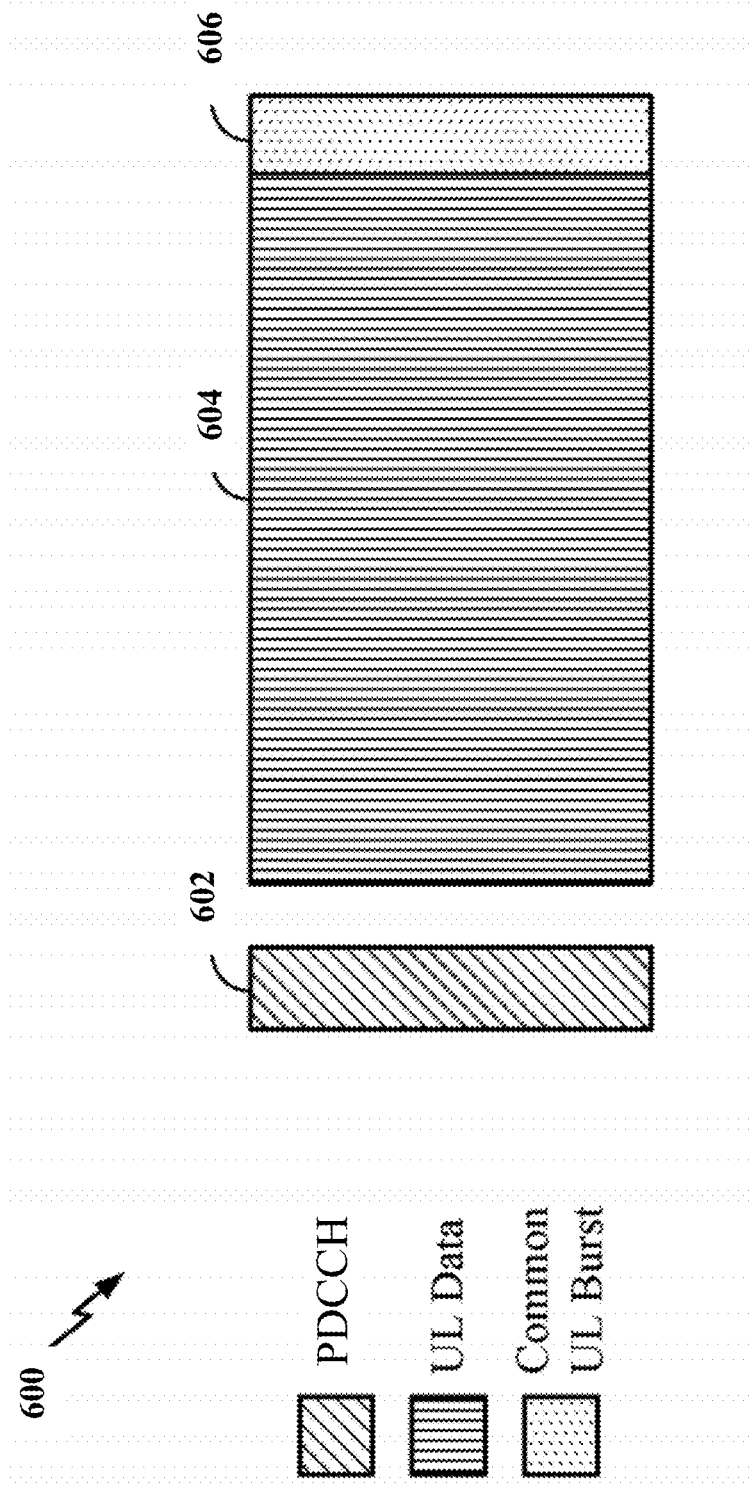
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

"Subnetworking" is one of the emerging major topics. The 6G radio access technology is expected to support extreme communication requirements in terms of through-put, latency, and reliability. Subnetworking is identified in recent 6G overview literature among a plethora of unique technologies for the support of the demanding 6G services. The main objectives of deploying subnetworks include offloading most demanding services from the classical macro networks, to support extreme performance requirements at any suitable location and at any time. This is important, as it is expected to have increasingly much more demanding future services, which require offloading of the most constraining functions/services from some user devices to their neighboring devices, in addition to the classical macro networks (i.e., edge computing).

Noticeably, the state-of-the-art network resource sharing and computation offloading systems including 4G and 5G networking technologies, has the following limitations. (1) One requires service provisioning by the network operators: Applications or Services that may use distributed compute resources must be pre-provisioned by the network operator. Consequently, the (new) applications/services that are not pre-provisioned cannot use distributed resources. (2) The scope of the service-based architecture (SBA) in 5G is limited to the Core Network (CN) domain. It does not extend to the Radio Access Network (RAN) domain and does not include the user device domain. Thus, Virtual Network Function (VNF) distribution to the end-devices is limited. (3) To use the compute resource sharing, any user device must be subscribed to a network operator and must be connected to the operator's network. Thus, the non-registered user devices cannot use the compute resource sharing. Providing compute resource sharing to the subscribed user devices is simpler to manage by the network operators in terms of network security. However, considering the sheer increase of the number of user devices that may not require direct connectivity to an operator's network to be operational (e.g., wearables, ambient devices, IoT sensors), extending the compute resource sharing to unsubscribed user devices promises new business opportunities and potential new revenue streams (e.g., possibility to opt in compute resource sharing services subject to some attractive incentive-based policies). The network security concerns related to unsubscribed user devices may be eliminated/alleviated with various network virtualization and isolation methods, which detect the malicious software and prevent its propagation deeper into the network.

Hence, there is a need for a flexible subnetwork architecture and communication/compute protocols that enable compute resource sharing and network connectivity resource sharing while involving both non-registered user devices and operator networks.

One aspect of the disclosure relates to a subnetwork architecture, as well as a subnetwork formation mechanism together with the underlying protocol messages for operating subnetworks that are foundational to supporting user device centric compute resource sharing and network connectivity resource sharing. The architecture may be a 6G device cloud architecture together with its communication and compute protocols, and may provide a device cloud formation/re-formation framework for user device centric compute resource and network connectivity resource sharing, enabling dynamic compute resource sharing with other neighboring user devices and/or network nodes, as well as dynamic sharing of network connectivity resources, without prior provisioning between a resource renter (meaning the entity lending resources) and a resource tenant (or borrower, meaning the entity borrowing resources).

The device cloud is a dynamic cluster of nodes built around a user device, which may include other user devices and/or network nodes working together to execute a software task, such as a distributed module of an application or a service running on the said user device. Hence, in a general sense, the dynamicity of the cluster defining the device cloud is determined by a given application, i.e., the device cloud can change in topology/configuration and nodes composition from application to application. The subnetwork is a network that connects user devices and/or other end-devices, such as unmanned devices or IoT devices.

Figure 7:
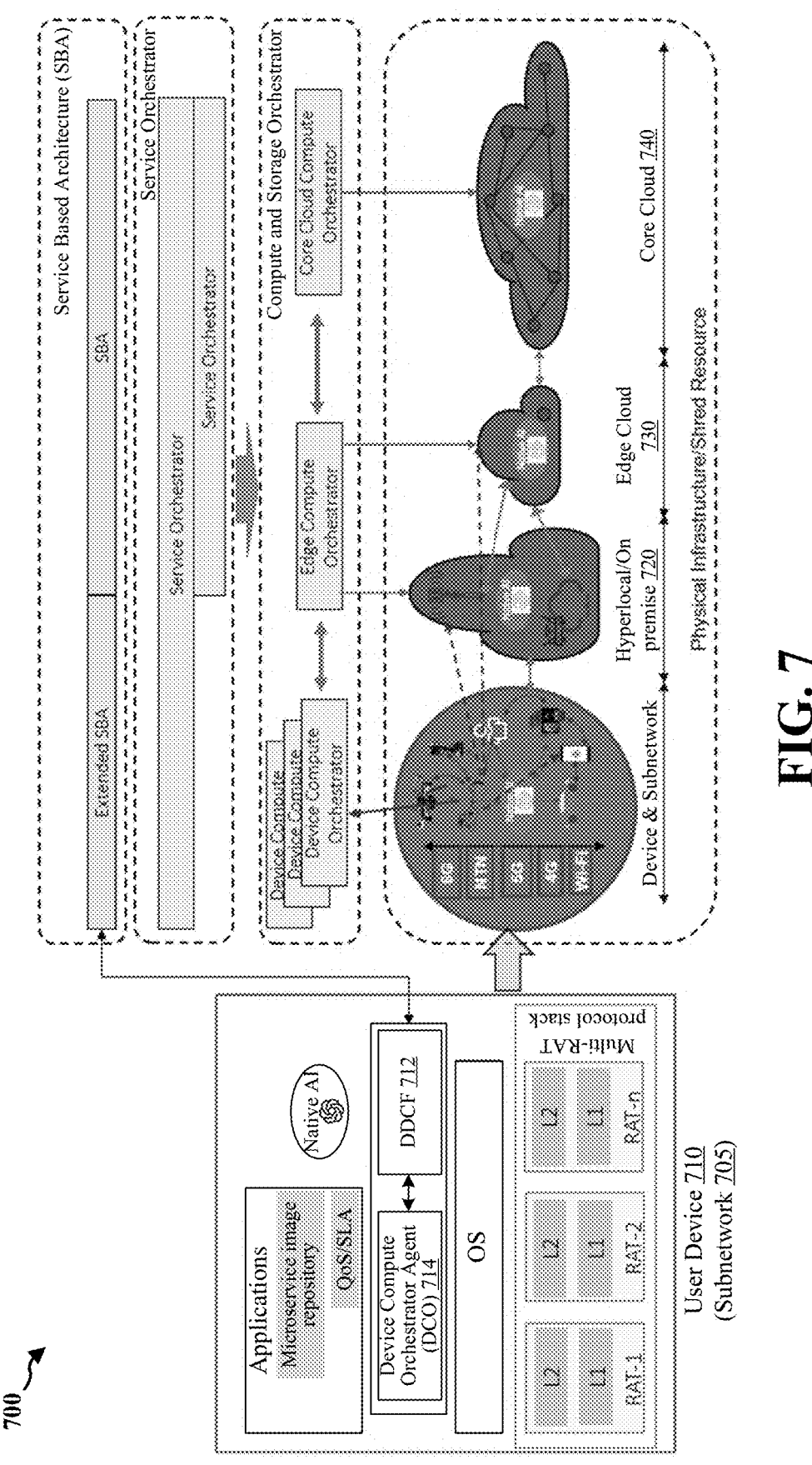
FIG. 7 is a diagram illustrating a user centric network architecture and computer resource orchestrators.

FIG. 7 is a diagram illustrating a user centric network architecture and computer resource orchestrators. As shown in FIG. 7, the architecture 700 includes a core cloud 740, an edge cloud 730, a hyperlocal/on premise cloud 720 (e.g., a base station (BS), an access point (AP), and/or a gateway (GW)), and devices and subnetworks. Specifically, the term "device" herein refers to any device or system that is connected to a network, which may be a user device or a network node. In the architecture 700, a user device 710 (which is defined as an end user device or a peripheral device, such as a smartphone or a smart glass) may support multi-RATs, such as 6G, 5G NR, LTE, Wi-Fi, and Bluetooth. Examples of the user device 710 may include, without being limited to, an IoT device, a camera, a drone, a smartphone, a smart glass, a smart watch, or other types of user devices. In certain embodiments, the user device 710 may be in a subnetwork 705, which is formed by the user device 710 and/or other devices (e.g., other user devices and/or network devices).

As shown in FIG. 7, the user device 710 is provided with a distributed device cloud function (DDCF) 712, which is a device cloud/user centric network management module in the user device/UE 710 that handles the communication with other neighboring devices via the underlying access technologies. Unlike the typical cloud orchestration or network orchestration, the user device 710 autonomously manages its own compute orchestrator, which is herein named a "device compute orchestrator" (DCO) 714, that can operate independently without being connected to the operator's network. Specifically, the user device 710 includes both the DDCF 712 and the DCO 714 to enable the DDCF operation without being connected to an overlay network. To increase the scalability of supported applications which use the compute resource sharing service (often referred as Compute as a Service (CaaS)), any application relying on CaaS and containing the necessary microservice images may use the device (which may be any device or system that is connected to a network, such as a user device or a network node) and network compute resource sharing service without being provisioned in the operators' network. The necessary microservice images may also be located in a network repository with network connectivity requirement. It is recommended to define the QoS information for the application and microservices that will be used so that one can identify/find the appropriate amount of device/network resources. If this information is not provided, then a default configuration could be used.

When a device (e.g., the user device 710) is connected to the network and a pre-provisioned service is instantiated, the compute orchestrator of the edge cloud 730 and the compute orchestrator of the core cloud 740 under the service orchestrator support the (user) device in a traditional manner. In addition to the network centric service, a compute resource sharing service provided by a user device centric network (or a device cloud) enables the hyper-local, edge and core clouds to actively provide the necessary network capabilities information to the connected user device 710. The (user) device compute orchestrators and the device cloud network management modules may become a part of an extended SBA of the network operator, and may be managed by the operator, providing the connected user device is subscribed to the network operator. In this way, a connected (user) device can forward the retrieved capabilities information (or received messages) from the overlay network to other (user) devices in the user device centric network which are not directly connected to the overlay network. On the other hand, an unsubscribed user device, which is not directly connected to the overlay network, may be clustered in the subnetwork, such that the subscribed user device may forward the capabilities information, and the unsubscribed user device may receive the capabilities information forwarded by the subscribed user device, and vice versa.

As an example, the smartGlass runs its own DCO (shown in the solid arrow) and uses compute resources from the smartphone device, hyper-local (on premise) cloud and edge cloud (shown in the dotted arrows) in FIG. 7. A device centric network could be connected to multiple operator networks at the same time, but the description in the embodiments uses a single operator case for simplicity.

Figure 8:
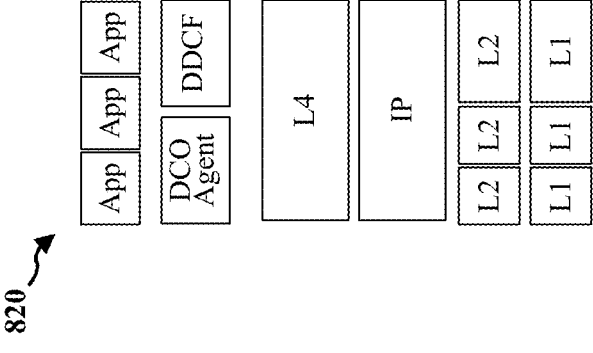
FIG. 8 is a diagram illustrating formations of a user device.
Figure 8:
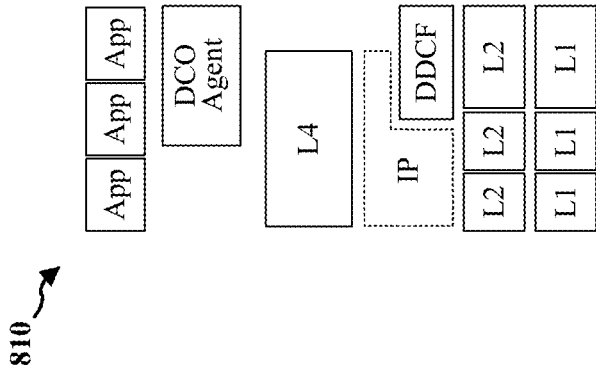

FIG. 8 is a diagram illustrating formations of a user device. In certain embodiments, the DDCF could be placed below or above the network layer (e.g., the IP layer, Layer 3 or L3), depending on the connectivity mechanisms between user devices or whether the network layer (e.g., the IP layer) is supported by user devices. As shown in FIG. 8, the user device may include two different formations. For example, in one embodiment, the user device 810 is formed such that the DDCF of the user device 810 is placed below the IP layer and above the data link layer (Layer 2 or L2). Specifically, when a direct Layer 2 or a Local Area Network (LAN) type of connectivity is supported by the user device 810, the DDCF may be placed below the IP layer and directly above the data link layer. In this case, when the DDCF generates a DDCF message, the DDCF may receive an IP packet from the IP layer and encapsulate the IP packet to form the DDCF message. Alternatively, the DDCF may directly generate the DDCF message without receiving the IP packet. In an alternative embodiment, when the user device 810 does not support the IP layer (i.e., the user device 810 is without the IP layer), the DDCF may be placed directly above the data link layer (L2).

In another embodiment, the user device 820 is formed such that the DDCF of the user device 820 is placed above the IP layer. Specifically, if the RATs of the user device 820 support IP connectivity establishment between user devices, the DDCF may be placed above the IP layer. In particular, the DDCF of the user device 820 is placed above the transport layer (i.e., Layer 4 or L4) and at the application layer. In this case, when the DDCF generates a DDCF message, the DDCF message may be sent through the IP layer and encapsulated in an IP packet. The DDCF may also be required to identify a destination layer of the DDCF message with a transport layer port number.

In certain embodiments, the user device 810/820 may be used in a device cloud protocol architecture with an end-to-end protocol stacks supporting remote compute resource sharing over a device cloud, in which the compute resources may stretch across devices (e.g., user devices) in the subnetwork, hyperlocal cloud, edge cloud and core cloud.

Figure 9:
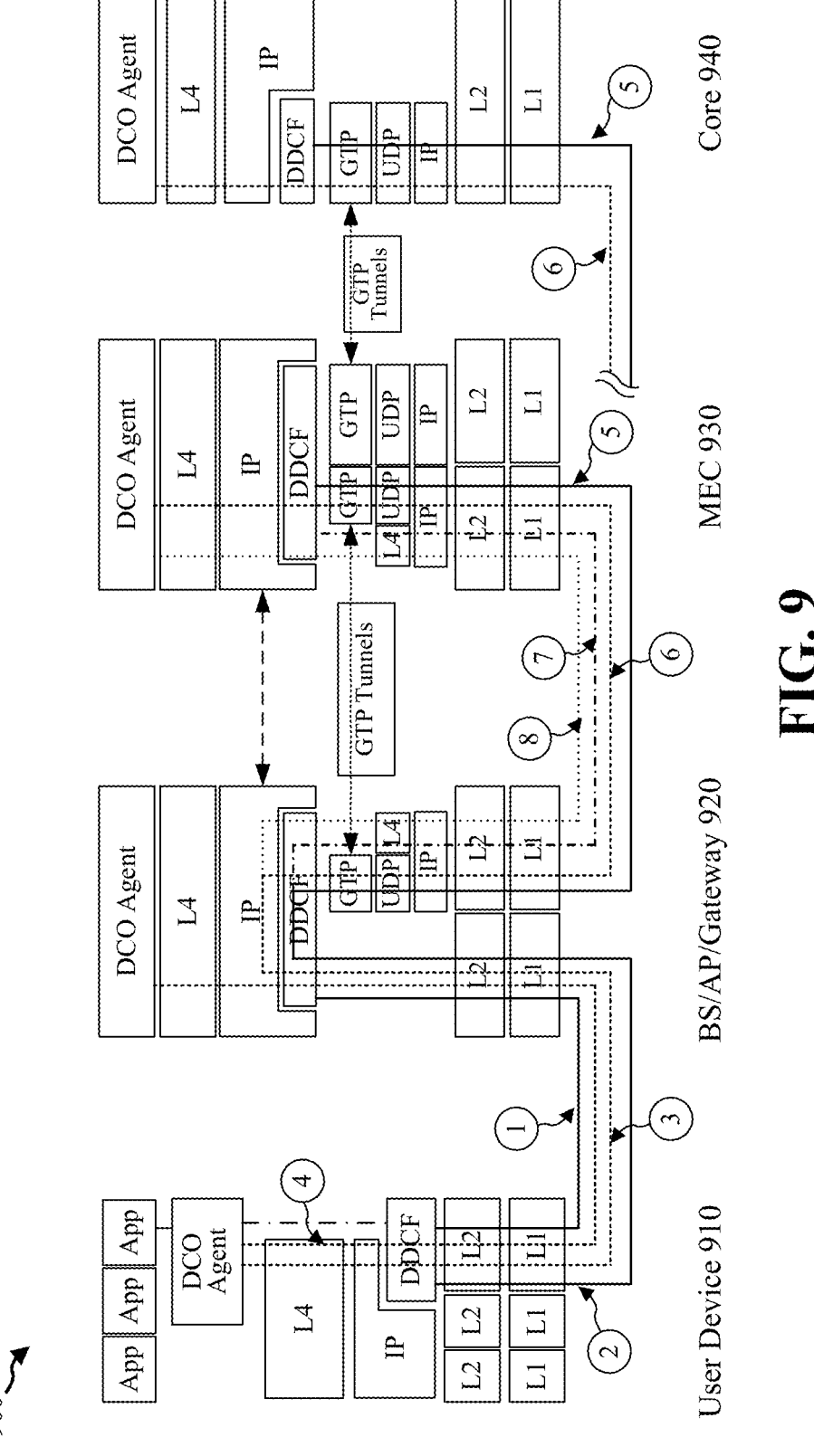
FIG. 9 is a diagram illustrating a device cloud protocol architecture, with the DDCF of the user device above the L2 layer and below the IP layer.

FIG. 9 is a diagram illustrating a device cloud protocol architecture, with the DDCF of the user device above the L2 layer and below the IP layer, and FIG. 10 is a diagram illustrating protocol headers of the exemplary traffic flows in FIG. 9. For simplicity, in the architecture 900 as shown in FIG. 9, a single user device 910 is shown, which is a subscriber of the network. The user device 910 has a similar structure to the user device 810, with the DDCF being placed above the L2 layer and below the IP layer. In certain embodiments, the user device 910 may include the DDCF by default. Alternatively, the DDCF may be instantiated by the network in the user device 910, providing the network supports remote compute resource sharing services to all user devices via the subnetwork and the user device 910 is a subscriber device. In the user device 910, the DDCF works as a control plane (or management module) for the subnetworking operations, and it also works as a protocol layer that generates device cloud packets or encapsulate/decapsulate the packets passing through the DDCF. In one embodiment, as shown in FIG. 9, when the DDCF is placed below the IP layer, the DDCF may be placed right above the L2 layer for describing the IP tunnel-based device cloud protocol architecture.

Figure 11:
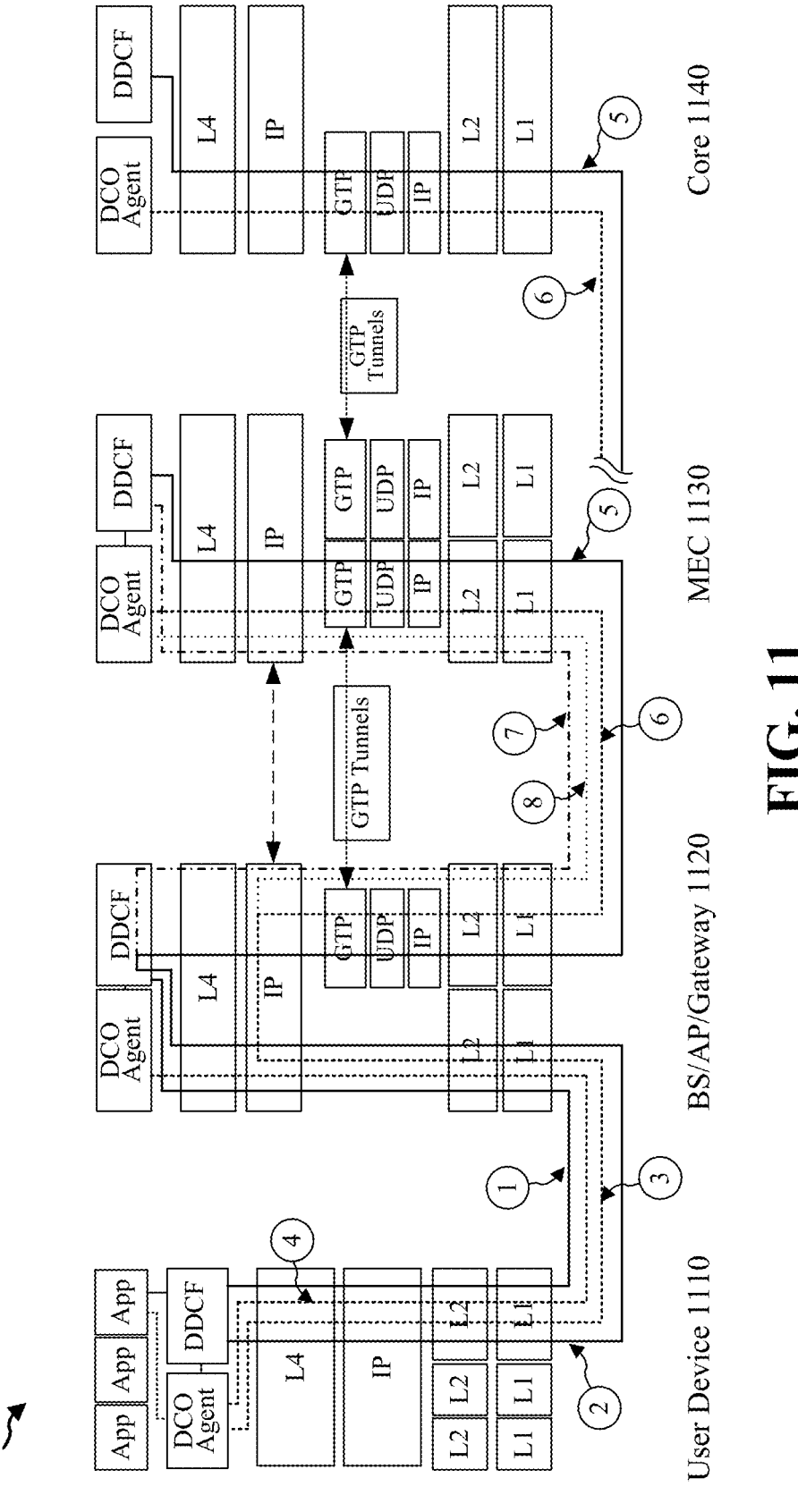
FIG. 11 is a diagram illustrating a device cloud protocol architecture, with the DDCF of the user device above the IP layer.

FIG. 11 is a diagram illustrating a device cloud protocol architecture, with the DDCF of the user device above the IP layer, and FIG. 12 is a diagram illustrating protocol headers of the exemplary traffic flows in FIG. 11. For simplicity, in the architecture 1100 as shown in FIG. 10, a single user device 1110 is shown, which is a subscriber of the network. The user device 1110 has a similar structure to the user device 820, with the DDCF being placed above the IP layer. In particular, the DDCF of the user device 1110 is placed above the transport layer (L4), or more precisely, at the application layer.

The exemplary traffic flows as shown in FIG. 9 and FIG. 11 are described as follows. Using the architecture 900 in FIG. 9 as an example, during this phase, a service bearer needs to be created between a "renter," which refers to the entity lending compute resources, e.g., the BS 920, the Multi-Access Edge Computing (MEC) 930 or the Core 940, and the proxy device (e.g., the user device 910), which is referred as a "tenant" (i.e., the entity borrowing compute resources). Intermediate GTP or IP tunnels may need to be established (e.g., between BS/AP/GW 920 and the renter in the edge cloud 930, and between BS/AP/GW 920 and the renter in the core cloud 940). These network tunnels are transparent to the user device 910. The mapping mechanism between the service bearers and the network tunnels is specific to the operator network. In certain configurations, if the renter is reachable with the renter IP address from the BS/AP/GW 920, then the renter IP address could be proxied at the BS/AP/GW 920, instead of establishing network tunnels. In this case, the DDCF could be placed above the LA protocol layer in the network nodes (i.e., using the architecture 1100 as shown in FIG. 11). However, the protocol stack in the BS/AP/GW may require a more sophisticated implementation, if the DDCF towards the air interface needs to be placed below the IP layer, as shown in FIG. 9.

In the architecture 900/1100, prior to running microservices in a renter (e.g., remote user devices or network nodes), the tenant device (e.g., the user device 910/1110) must discover: (i) which neighboring devices and/or network nodes may share compute resources, (ii) renter capability, (iii) renter id, and (iv) renter IP address. In this case, the tenant device (e.g., the user device 910/1110) informs the amount of compute resources required, and establishes a device cloud frame switching/forwarding (switching and forwarding are used interchangeably) table.

The device cloud message exchange during this phase is done via device cloud control plane and the exemplary traffic flows are labeled as (1), (2), (5) and (7) in FIG. 9 and FIG. 11, and the corresponding protocol headers are shown in FIG. 10 and FIG. 12. The flows (1) and (2) are between the DDCF in the user device 910/1110 and the DDCF in the BS/AP/GW 920/1120, which is one airlink hop away, while the flows (5) and (7) are between the DDCF in the BS/AP/GW 920/1120 and the DDCF in the edge cloud 930/1130.

A direct device-to-device (D2D) control plane communication between DDCFs over the air interface (flows (1) and (2)) is a point-to-point communication. If a LAN type of connectivity between user devices is supported and the DDCF is placed above the L2 layer as shown in FIG. 9, the communication between DDCFs does not need to involve the IP layer, and traffic forwarding via intermediate user devices may be done via the device cloud frame switching/forwarding mechanism in the DDCF. Every DDCF of a device (e.g., the user device 910/1110) that belongs to a subnetwork maintains a device cloud frame switching/forwarding table that includes information of other neighboring devices in the same subnetwork (e.g., device ID of a destination device, IP addresses of the destination user device(s) and network node(s), output RAT ports, and next hop (user) device or network node IDs in the transmission path to the destination device).

If IP connectivity between user devices is supported and the DDCF is placed above the IP layer as shown in FIG. 11, a DDCF message is encapsulated into an IP packet. In this architecture 1100, the traffic forwarding/switching can be done by using the device cloud frame switching/forwarding table similar to the description from above, with the exception of an additional parameter, namely a transport layer port number, which is used to identify the destination layer (i.e., the transport layer). The communication between user devices may also use an IP tunneling mechanism.

The DDCF control plane message beyond the base station 920/1120, as shown by flows (5), (7), (6) and (8) in FIG. 9 and FIG. 11, however, always needs to travel along the IP network layer for accessing the network nodes in the edge/core clouds. During this phase, a service bearer needs to be created between the renter and the proxy (user) device (the tenant user device 910/1110), and intermediate GTP or IP tunnels may be established for this purpose, providing two end points are not initially known to each other (flows (5) and (6)). Otherwise, native IP communications may be used (flows (7) and (8)). The network tunnels are transparent to tenant (user) devices. The mapping mechanism between the service bearers and network tunnels is specific to the operator network. A GTP tunnel is used as an exemplary embodiment in the architecture 900/1100, but other tunneling mechanisms could be used. Altenatively, tunneling may be simply omitted providing that the end points are directly reachable.

Once neighboring user devices and/or network nodes (BS 920/1120, MEC 930/1130 and Core 940/1140) are identified as renter entities, the orchestrator in the tenant device (e.g., the user device 910/1110) works together with the orchestrator agent modules in the identified renter entities, and the communication between the renter entities in the orchestration cluster is established via TCP/UDP over IP.

In particular, the flow (4) is between the orchestrator agent of the user device 910/1110 and the orchestrator agent of the BS/AP/GW 920/1120. The flow (3) starts from the orchestrator agent of the user device 910/1110, goes through the DDCF/IP layer (for the architecture 900 in FIG. 9) or through the IP layer (for the architecture 1100 in FIG. 11) of the BS/AP/GW 920/1120 (but does not reach into the orchestrator agent of the BS/AP/GW 920/1120), and transforms into the flow (6) onwards to the edge cloud 930/1130 (reaching into its orchestrator agent) and to the core cloud 940/1140 (reaching into its orchestrator agent). The flow (2) between the DDCF of the user device 910/1110 and the DDCF of the BS/AP/GW 920/1120 transforms into flow (5) onwards to the network elements and bridges the communication between the respective DDCFs (see FIG. 9 and FIG. 11). The flows (5) and (6) from the core cloud 940/1140 are not extended to the user device to simplify FIG. 9 and FIG. 11.

Figure 13:
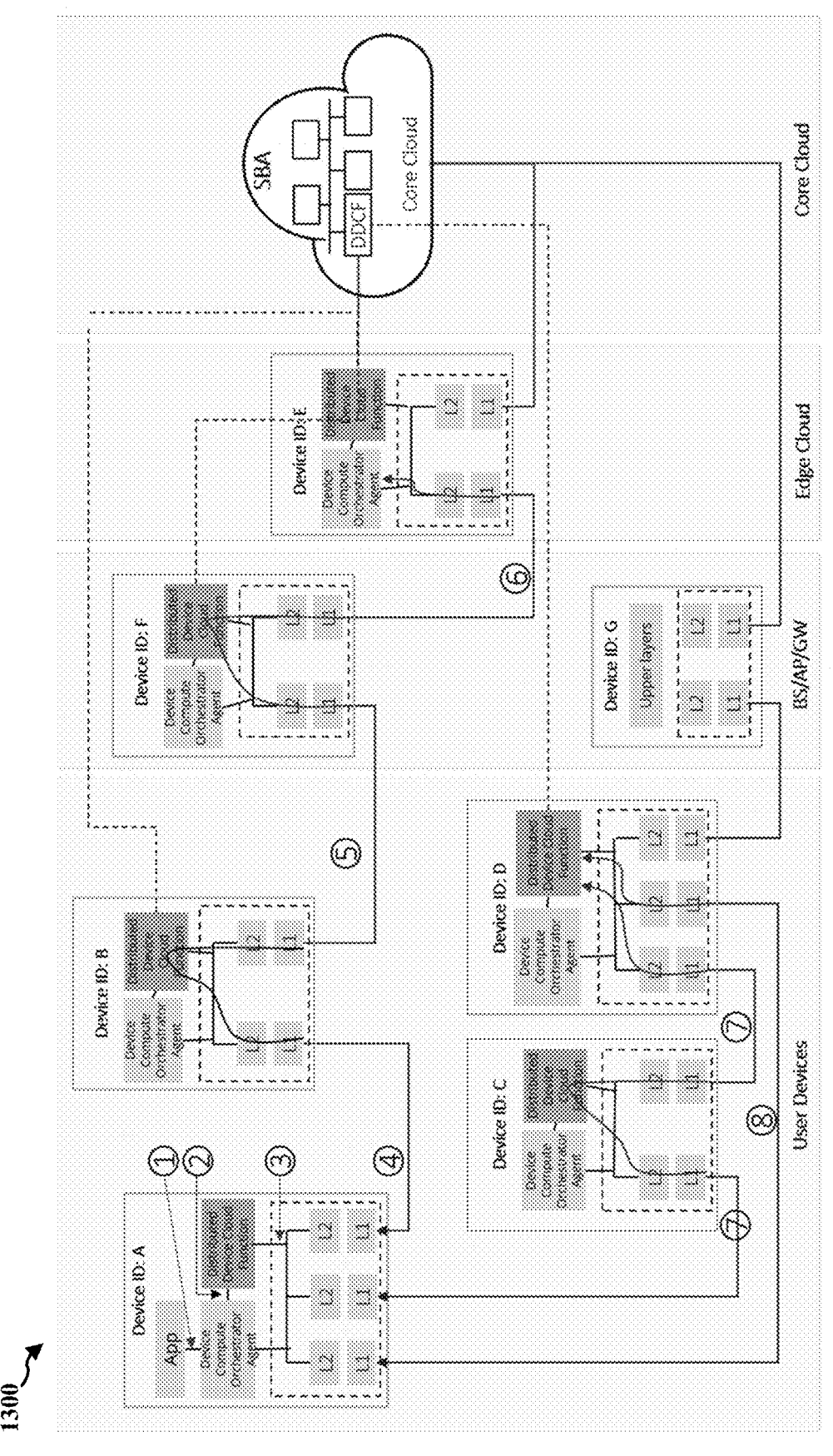
FIG. 13 is a diagram illustrating the DDCFs in the user devices and network nodes, along with the subnetwork traffic flow paths.

FIG. 13 is a diagram illustrating the DDCFs in the user devices and network nodes, along with the subnetwork traffic flow paths. As shown in FIG. 13, in the architecture 1300, the subnetwork includes user devices A, B, C and D, a network node E (e.g., the edge cloud), a network node F (e.g., a gateway), and a network node G (e.g., a BS/AP/GW). Specifically, the user devices A and D support three RATs, while the user devices B and C support two RATs. The user device B is connected to the network node (e.g., the BS/AP/GW) F, and the network node F is further connected through the network node E to the edge cloud of the network operator. The user device D is connected to another network node (e.g., the gateway) G, which is further connected to the core cloud of the same network operator. Therefore, the user devices B and D are subscribers of the same network operator, while the user devices A and C may be unsubscribed user devices, which are not subscribed to the network operator in this exemplary embodiment.

In the architecture 1300, if the network supports granting remote compute resource to user devices via device cloud, then the DDCF in the core network configures the network nodes in the core cloud, edge cloud, hyperlocal cloud, and the subscribed user devices (e.g., the user devices B and D). The dotted lines from the DDCF in the core cloud to the DDCFs in the network nodes E and F, and to the subscriber user devices B and D indicate a distributed device cloud function instantiation and/or configuration scenario.

Then, the network nodes supporting remote compute resources (e.g., the network nodes E and F) transmit their intention (via requests) to participate in the compute resource sharing, and the intermediate user device B adds its own device id B into the forwarding message to indicate the traffic path. During this phase, a service bearer needs to be created between the renter and the proxy device (e.g., the user device B), and intermediate GTP or IP tunnels may be also established if the network requires GTP or IP tunneling. The network tunnels are transparent to tenant devices (e.g., the user device A).

The following steps describe the buildup of the device cloud frame switching table through the embodiment illustrated in FIG. 13. At flow (1), the user device A runs an application. The user device A estimates of the amount of compute resource may be required by the said application. The user device A may further estimate the amount of compute resources is higher than what user device A is able to provide. At flow (2), the device compute orchestrator hosted by the user device A triggers the DDCF of the user device A to discover remote compute resources.

At flow (3), if the user device A is not currently in a subnetwork, then all the RATs of the user device A attempt to connect to neighboring user devices. Subsequently, the neighboring user devices (e.g., user devices B, C and D) that are able to collaborate establish connectivity to the user device A using the corresponding RAT specific protocol, including security mechanisms. At flow (4), after a subnetwork is established, the DDCF of the user device A broadcasts a subnetwork message, namely a resource inquiry message via all connected RATs. This resource inquiry message contains information of a destination device and the source device (i.e., the user device A). For example, the resource inquiry message may include information such as (destination device ID=X, source device ID=A), where the device ID 'X' indicates any subnetwork device ID.

At flow (5), the user device B, upon receiving the resource inquiry message from the user device A, forwards the resource inquiry message to the network node F. At flow (6), the network node F, upon receiving the resource inquiry message forwarded by the user device B, forwards it to the network node E in the edge cloud. Every intermediate device (e.g., the user device B and the network node F), along the path between the tenant and the renter, updates the device cloud frame forwarding table that contains neighboring information (destination device ID, destination device IP address, RAT output port, and next hop device ID). If the network node E is willing to provide the requested compute resources, then it sends an acknowledgement message with its IP address back to the user device A (through the intermediate devices F and B). Upon receiving the acknowledgement message, the user device A has the information about the network node E, including information as to how to reach out to the network node E.

At flows (7) and (8), another exemplary traffic flow is between the user devices A and D, which shows a potential frame switching loop issue, because the user device D receives duplicated resource inquiry messages, including one message forwarded by the user device C via the flow (7) (i.e., the user device A to the user device C, and then to user device D), and another message delivered directly from the user device A via the flow (8) (i.e., the user device A to user device D), through different RATs. In this case, the duplicated resource inquiry messages may be identified by the message sequence number, and the forwarding loop can be identified by the path vector in the device cloud message. The user device D shall choose the optimal link to avoid a forwarding loop.

Figure 14:
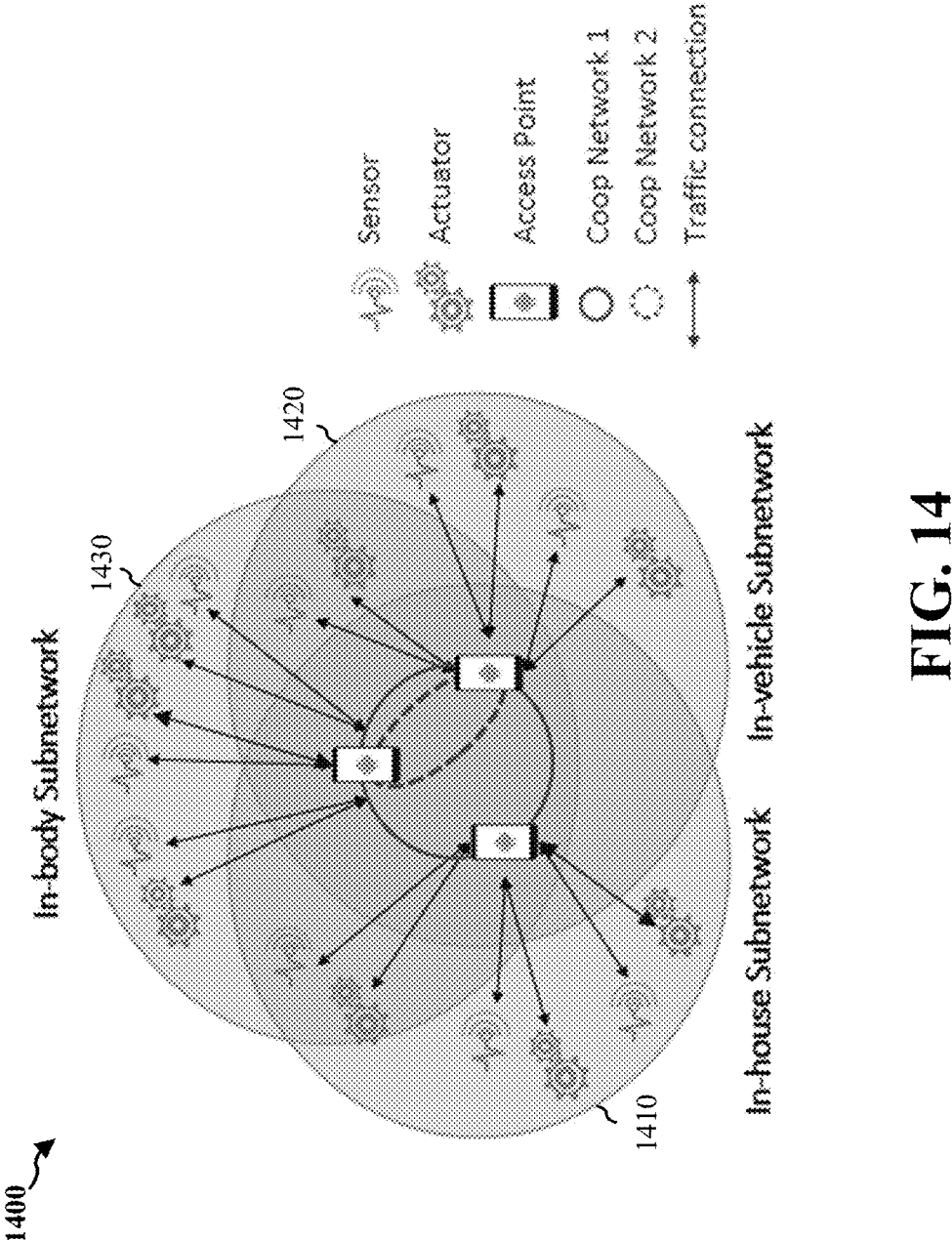
FIG. 14 is a diagram illustrating a simplified collaborative subnetwork formed by three subnetworks.

FIG. 14 is a diagram illustrating a simplified collaborative subnetwork formed by three subnetworks. Specifically, the simplified collaborative subnetwork 1400 is formed by three subnetworks, including an in-house subnetwork 1410, an in-vehicle subnetwork 1420, and an in-body subnetwork 1430. These subnetworks may operate independently when the APs of the subnetworks are out of reach from one another. When the APs are within reachable distance, the APs may autonomously discover the eligible neighboring subnetworks, establish connections and configure routing. In certain configurations, each service may have a different level of accessibility, and connectivity may be limited even though the neighboring subnetworks are physically reachable. Thus, some services may collaborate with more subnetworks, while other services may be limited to collaborate with only a subset of subnetworks. A service may be authorized to connect to all three subnetworks 1410, 1420 and 1430 (i.e., solid circle), while another service may be authorized to connect to only two subnetworks 1420 and 1430 (i.e., dotted circle).

In certain configurations, dynamic subnetwork deployment and compute resource sharing is characterized by uncoordinated subnetwork deployment and support dynamic addition of user devices to an existing subnetwork, as well as removal of uncoordinated user device(s) from the subnetwork. For example, as shown in FIG. 14, in addition to the In-X subnetworks 1410, 1420 and 1430 whose boundaries are somewhat predetermined, "open" subnetworks may be formed by further identifying compute (user) devices on the fly to achieve another level of services. This will help remove the constraints associated with serving users at dedicated locations. In the case where an open subnetwork is formed, the open subnetwork also enables sharing compute resources among user devices connected in the same subnet, because some user devices may not be actively used (or may have spared compute resources) in a crowded area, and hence their compute resources may be leased to some neighboring user devices.

For the 6G subnetwork formation mechanism, each user device in a subnetwork must be pre-associated with an authentication and encryption mechanism specific to the underlying wireless communication technology (e.g., Bluetooth, Wi-Fi, 5G, 6G) used by the subnetwork for establishing a secure connection between devices without manual intervention.

The DDCF broadcast messages do not need to be encrypted if the network formation is open to any devices, but the point-to-point communication DDCF messages may be delivered through an encrypted secure channel on top of the security mechanism for the specific L1 and L2 layer. In certain configurations, the devices (e.g., user devices and network nodes), whether they play the role of a "renter" or a "tenant" entity, may also subscribe to a reward or payment service for a resource sharing service fee, in exchange of compute resources and/or network connectivity they offer. Specifically, a "renter" is a device (e.g., a user device or a network node) willing to share compute or network connectivity resources in exchange of a form of reward from at least one "tenant", or a network/service provider. A "tenant" is a user device that may make use of compute and/or network connectivity resources from other devices (i.e., at least one renter device) in exchange of a service fee paid to the renter.

In certain configurations, a subnetwork may be specifically configured for a dedicated role. Alternatively, a subnetwork may be also dynamically formed as needed. A typical user device, such as smartphone or smartglass, could be an end user device simply connected to a standalone AP, or may be capable and allowed to establish multi-connectivity configurations through other APs which belong to different subnetworks and/or overlay networks. When a user device provides either compute or network connectivity resources (or both types of resources simultaneously), it becomes yet another AP within the same subnetwork. Furthermore, the APs in multiple subnetworks may form a hyper-subnetwork (network of subnetworks, or super-subnetwork).

In certain configurations, if communication between subnetworks is needed, a unique subnetwork ID may be used. On the other hand, if a subnetwork undergoes dynamic transformations (e.g., a subnetwork subject to split and merge operations), it may not be feasible to track the subnetwork ID update.

In certain configurations, the subnetworks may be subjected to subnetwork merge and/or subnetwork split. Specifically, when an AP in a subnetwork is connected to an AP in another subnetwork, the two corresponding subnetworks may be merged to form a single subnetwork. In this case, all APs in the merged subnetwork should discover routing paths for the user devices in the subnetwork, and the APs may build either a flat network for routing flexibility or a hierarchical structure for simpler connectivity management. On the other hand, when the last communication channel between APs in a (merged) subnetwork becomes inactive, or the connection is lost in the subnetwork, each segment of the subnetwork may split to become an individual subnetwork.

In certain configurations, the boundary of subnetwork is drawn based on the service connectivity instead of physical connectivity considerations. In other words, even though a user device and an AP of a subnetwork are physically close, it is possible that the end user device is not a part of the subnetwork as long as the AP has no resources available for the end user device.

Figure 15:
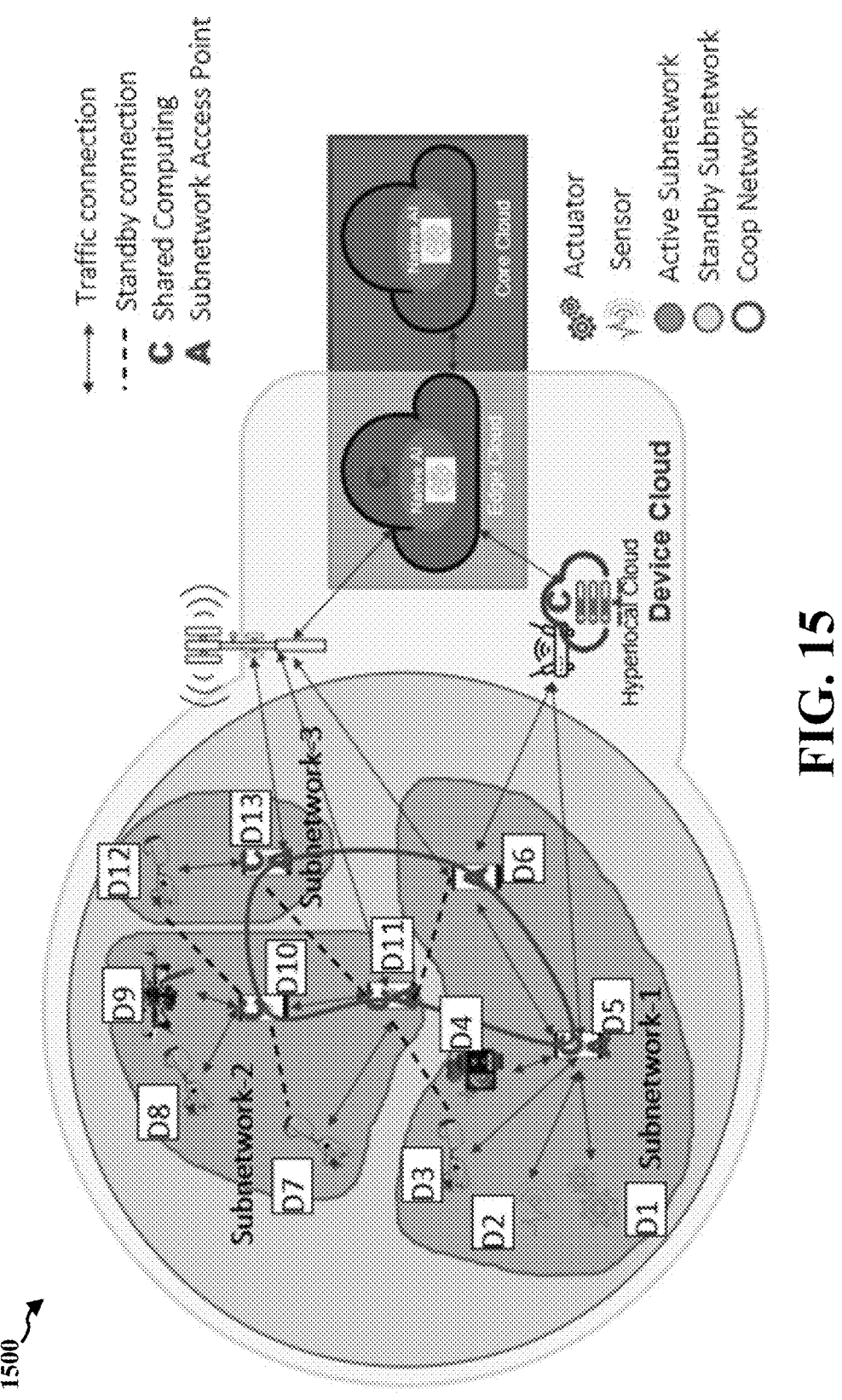
FIG. 15 is a diagram illustrating multiple subnetwork formation, connectivity and multi-connectivity.

FIG. 15 is a diagram illustrating multiple subnetwork formation, connectivity and multi-connectivity. As shown in FIG. 15, in the network 1500, a plurality of subnetworks (namely subnetwork-1, subnetwork-2 and subnetwork-3) are formed. The subnetwork-1 includes devices D1, D2, D3, D4, D5 and D6. The subnetwork-2 includes devices D7, D8, D9, D10 and D11. The subnetwork-3 includes devices D12 and D13. Among all the devices D1-D13, the devices D5, D6. D11 and D13 are APs. Specifically, an end user device may be connected to multiple subnetworks, as long as the APs providing connectivity services to the said end user device belong to separate subnetworks. For example, if the device D3 is connected to the AP D5 (solid line) and to the AP D11 (dotted line) in FIG. 15, implicitly the device D3 is connected to both subnetwork-1 and subnetwork-2, because the APs D5 and D6 (the APs of the subnetwork-1) are not connected to any APs in subnetwork-2 (formed by D7, D8, D9, D10 and D11). The solid lines indicate active traffic connections that carry user traffic between the connected devices. The dotted lines indicate standby connections that are not being used for user traffic delivery, but the devices connected with dotted lines may be switched on from the standby connection mode to an active connection mode when the existing active connections cannot support the required service quality. In other words, the device D3 is currently in an active traffic connection with the AP D5, and the connection between the device D3 and the AP D11 is a standby connection.

In certain configurations, the communication between devices in a subnetwork may be a direct D2D communication, or may be forwarded through the APs in the subnetwork if D2D connection is not available. The destination is identified with a device Universally Unique Identifier (UUID) and the MAC address similar to L2 switching. Hence, centralized IP addressing is not needed for the subnetwork operation. If a device needs an IP address, it can be obtained from the overlay network or from the first AP hop in the subnetwork. The AP must provide a Network Address Translation (NAT) function for the child devices if traffic needs to be forwarded to other devices in the subnetwork or to the overlay network.

Figure 16:
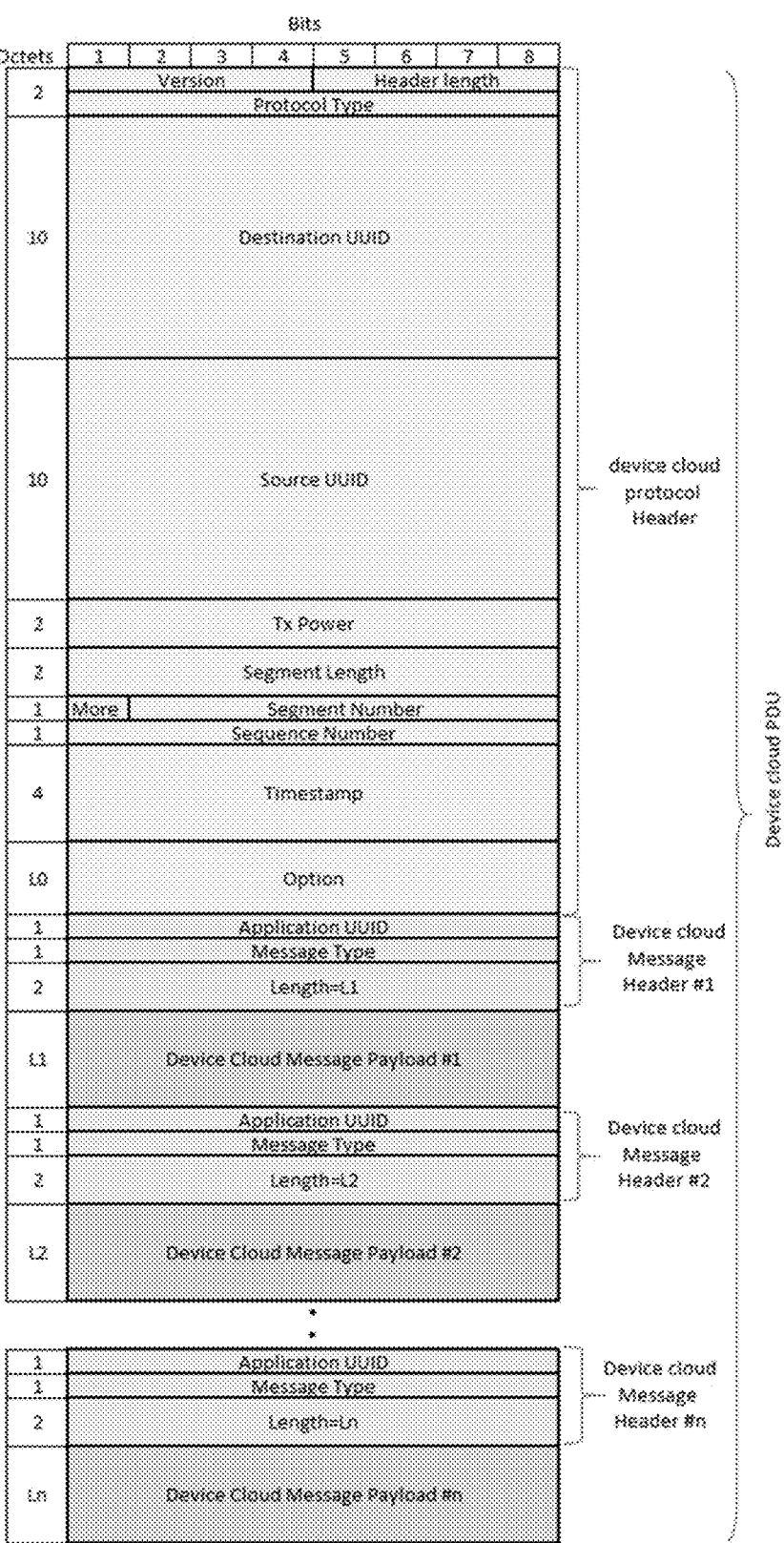
FIG. 16 is a diagram illustrating the device cloud packet structure.

FIG. 16 is a diagram illustrating the device cloud packet structure, which shows the key message definitions, formats, as well as the mandatory and optional parameters in the message payload. As shown in FIG. 16, each device cloud Packet Data Unit (PDU) includes a device cloud packet header and a plurality of device cloud messages #1 to #n. Each device cloud message includes a device cloud message header and a device cloud message payload, and the content in the device cloud message payload depends on the device cloud "Message Type" field in the device cloud message header. A device cloud PDU may include multiple device cloud messages, if (i) all messages are to be delivered to a single destination device or (ii) all messages are to be broadcasted within the respective subnetwork. The protocol fields and the length of each field are provided as exemplary embodiments of this patent application. The device cloud messages, formats and parameters may be used for both architectures 900/1100 regardless of the DDCF placement (either above the L2 layer as shown in FIG. 9 or above the IP layer as shown in FIG. 11).

In certain configurations, if the DDCF is located in between the IP layer and the L2 layer (e.g., the architecture 900 as shown in FIG. 9), the DDCF may use the following fast packet header inspection mechanism to separate the device cloud packets and the IP packets without decoding the entire device cloud packet header. The most significant 4-bits of the first device cloud packet header byte is the "Protocol Version" field, and it can be used as an identifier for an IP packet and a non-IP packet (e.g., the device cloud packet). Since there are only two IP protocol header version numbers, 4 and 6, in practical implementations, a device cloud protocol version number larger than 6 indicates that the packet under inspection is not an IP packet.

In certain configurations, when the packet is identified as the device cloud packet, the protocol type field in the device cloud packet header may be used to indicate a type of the device cloud packet.

In certain configurations, the device cloud packet header permits segmentation of messages, if required by transmission layer mechanisms. The value of the Sequence Number field increments with each message, while the Segment Number field defines the segment order within a message if the message is segmentized. The "More" field is a flag indicating whether more segments will follow the current segment.

Figure 17:
FIG. 17 is a flow chart of a method (process) for wireless communication of a user device.
Figure 17:
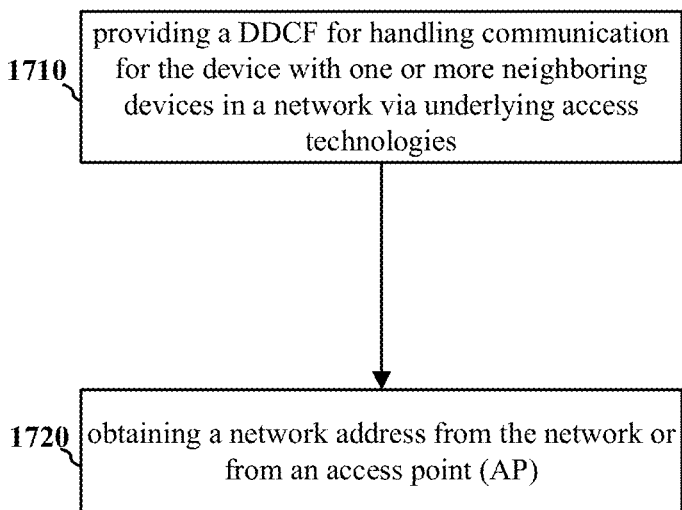

FIG. 17 is a flow chart of a method (process) for wireless communication of a device. The method may be performed by a device (e.g., the user device 810/820, 910/1110, or other devices such as a network node). At operation 1710, the device provides a DDCF for handling communication for the device with one or more neighboring devices in a network via underlying access technologies. At operation 1720, the device obtains a network address from the network or from an AP. The DDCF is configured to allow dynamic sharing of compute resources and network connectivity resources of the device with the neighboring devices in the network.

In certain embodiments, the device is a user device, and the user device is configured to obtain the network address from the AP by receiving, from the AP or from the network.

In one embodiment, the user device not in a subnetwork. The device further attempts to connect, with the underlying access technologies, to the neighboring devices. The device receives a response from one of the neighboring devices to establish connectivity using a protocol under a corresponding RAT.

In one embodiment, the device further creates a service bearer between a renter device in the network and the user device, wherein the user device functions as a proxy device for an unsubscribed device intended to access compute resources of the renter device through the proxy device.

In one embodiment, the device further receives, from an unsubscribed device, duplicated resource inquiry messages, including a first message forwarded by another user device and a second message directly from the unsubscribed device. The device identifies the duplicated resource inquiry messages by corresponding message sequence numbers, and identifies forwarding loops of the duplicated resource inquiry messages by path vectors in the device cloud message. The device selects an optimal link from the forwarding loops of the duplicated resource inquiry messages.

In one embodiment, the device further transmits, by the DDCF, DDCF messages in a point-to-point communication to a destination device through an encrypted secure channel.

In one embodiment, the device further subscribes, by the DDCF, to a reward or payment service for a sharing service fee in exchange of sharing of compute resource and network connectivity provided by the reward or payment service.

In certain embodiments, the device is an AP in a subnetwork, and the AP is configured to provide a Network Address Translation (NAT) function to forward a message to the neighboring devices in the subnetwork or to the network.

In one embodiment, the AP transmits, by the DDCF, DDCF broadcast messages to autonomously discover an eligible neighboring subnetwork within a reachable distance. In response to discovering the eligible neighboring subnetwork, the AP establishes a network connection with an AP of the eligible neighboring subnetwork and configuring routing with the eligible neighboring subnetwork.

In one embodiment, the subnetwork and the eligible neighboring subnetwork merge to form a single subnetwork in response to establishing the network connection between the AP of the subnetwork and the AP of the eligible neighboring subnetwork.

In one embodiment, the network and the eligible neighboring subnetwork in a merged single subnetwork split to become individual subnetworks in response to a last communication channel between the AP of the subnetwork and the AP of the eligible neighboring subnetwork becomes inactive, or in response to the network connection between the AP of the subnetwork and the AP of the eligible neighboring subnetwork being lost.

In one embodiment, the subnetwork is an open subnetwork with a boundary not predetermined and supporting dynamic addition of user devices and removal or uncoordinated devices from the subnetwork, and the DDCF broadcast messages are not encrypted.

In one embodiment, the device is configured to be connected to a plurality of subnetworks, and the device has an active traffic connection to one of the subnetworks, and standby connections to other ones of the subnetworks.

In one embodiment, the subnetwork is identified by a unique subnetwork identifier (ID). In one embodiment, the subnetwork has a boundary based on service connectivity of the subnetwork (and not the physical connectivity).

In certain embodiments, the DDCF is configured to generate one or more device cloud packet data units (PDUs), each device cloud PDU includes a device cloud protocol header and one or more device cloud messages, and each device cloud message includes a device cloud message header and a device cloud message payload.

In one embodiment, contents in the device cloud message payload of each device cloud message are based on a message type field in the device cloud message header of each device cloud message.

In one embodiment, the DDCF is placed below a network layer. The device further receives, by the DDCF, a packet from one of the neighboring devices. The device determines, by the DDCF, whether the packet received is an IP network packet or a device cloud packet based on a header of the packet. In response to determining the packet received to be the IP network packet, the device allows the IP network packet to transparently pass through the DDCF and reach an upper layer. In response to determining the packet received to be the device cloud packet, the device processes, by the DDCF, the device cloud packet.

In one embodiment, the header of the packet includes: a protocol version field indicating a protocol version of the packet and identifying the packet as the device cloud packet or the IP network packet, a protocol type field indicating a type of the device cloud packet, a segment number field indicating a segment order of the device cloud packet as a segment in a segmented message, a more field indicating whether any additional segment follows the device cloud packet in the segmented message, and a sequence number field indicating an incrementing sequence number of the message.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a device, comprising:
   providing a distributed device cloud function (DDCF) for handling communication for the device with one or more neighboring devices in a network via underlying access technologies; and
   obtaining a network address from the network or from an access point (AP),
   wherein the DDCF is configured to allow dynamic sharing of compute resources and network connectivity resources of the device with the neighboring devices in the network, wherein the device is a user device configured to obtain the network address from the AP or from the network,
   wherein when the user device is not in a subnetwork:
      attempting to connect, with the underlying access technologies, to the neighboring devices; and receiving a response from one of the neighboring devices to establish connectivity using a protocol under a corresponding radio access technology (RAT).

2. The method of claim 1, further comprising:
   creating a service bearer between a renter device in the network and the user device, wherein the user device functions as a proxy device for an unsubscribed device intended to access compute resources of the renter device through the proxy device.

3. The method of claim 1, further comprising:
   receiving, from another device, duplicated resource inquiry messages, including a first message forwarded by another user device and a second message directly from the another device;
   identifying the duplicated resource inquiry messages by corresponding message sequence numbers, and identifying forwarding loops of the duplicated resource inquiry messages by path vectors in the device cloud message; and
   selecting an optimal link from the forwarding loops of the duplicated resource inquiry messages.

4. The method of claim 1, further comprising:
   transmitting, by the DDCF, DDCF messages in a point-to-point communication to a destination device through an encrypted secure channel.

5. The method of claim 1, further comprising:
   subscribing, by the DDCF, to a reward or payment service for a sharing service fee in exchange of sharing of compute resource and network connectivity provided by the reward or payment service.

6. The method of claim 1, wherein the device is configured to be connected to a plurality of subnetworks, and the device has an active traffic connection to one of the subnetworks, and standby connections to other ones of the subnetworks.

7. The method of claim 1, wherein the DDCF is configured to generate one or more device cloud packet data units (PDUs), each device cloud PDU includes a device cloud protocol header and one or more device cloud messages, and each device cloud message includes a device cloud message header and a device cloud message payload.

8. The method of claim 7, wherein contents in the device cloud message payload of each device cloud message are based on a message type field in the device cloud message header of each device cloud message.

9. The method of claim 7, wherein the DDCF is placed below a network layer, and the method further comprises:
   receiving, by the DDCF, a packet from one of the neighboring devices;
   determining, by the DDCF, whether the packet received is an IP network packet or a device cloud packet based on a header of the packet;
   in response to determining the packet received to be the IP network packet, allowing the IP network packet to transparently pass through the DDCF and reach an upper layer; and
   in response to determining the packet received to be the device cloud packet, processing, by the DDCF, the device cloud packet.

10. The method of claim 7, wherein the header of the packet includes:
   a protocol version field indicating a protocol version of the packet and identifying the packet as the device cloud packet or the IP network packet,
   a protocol type field indicating a type of the device cloud packet, a segment number field indicating a segment order of the device cloud packet as a segment in a segmented message, a more field indicating whether any additional segment follows the device cloud packet in the segmented message, and a sequence number field indicating an incrementing sequence number of the message.

11. A method of wireless communication of a device, comprising:

providing a distributed device cloud function (DDCF) for handling communication for the device with one or more neighboring devices in a network via underlying access technologies; and obtaining a network address from the network or from an access point (AP), wherein the DDCF is configured to allow dynamic sharing of compute resources and network connectivity resources of the device with the neighboring devices in the network, wherein the device is an AP in a subnetwork, and the AP is configured to provide a Network Address Translation (NAT) function to forward a message to the neighboring devices in the subnetwork or to the network.

12. The method of claim 11, further comprising:

transmitting, by the DDCF, DDCF broadcast messages to autonomously discover an eligible neighboring subnetwork within a reachable distance; and in response to discovering the eligible neighboring subnetwork, establishing a network connection with an AP of the eligible neighboring subnetwork and configuring routing with the eligible neighboring subnetwork.

13. The method of claim 12, wherein the subnetwork and the eligible neighboring subnetwork merge to form a single subnetwork in response to establishing the network connection between the AP of the subnetwork and the AP of the eligible neighboring subnetwork.

14. The method of claim 13, wherein the network and the eligible neighboring subnetwork in a merged single subnetwork split to become individual subnetworks in response to a last communication channel between the AP of the subnetwork and the AP of the eligible neighboring subnetwork becomes inactive, or in response to the network connection between the AP of the subnetwork and the AP of the eligible neighboring subnetwork being lost.

15. The method of claim 11, wherein the subnetwork is an open subnetwork with a boundary not predetermined and supporting dynamic addition of user devices and removal or uncoordinated devices from the subnetwork, and the DDCF broadcast messages are not encrypted.

16. The method of claim 11, wherein the subnetwork is identified by a unique subnetwork identifier (ID).

17. The method of claim 11, wherein the subnetwork has a boundary based on service connectivity of the subnetwork.

18. An apparatus for wireless communication, the apparatus being a device, comprising:

a memory; and at least one processor coupled to the memory and configured to:

provide a distributed device cloud function (DDCF) for handling communication for the device with one or more neighboring devices in a network via underlying access technologies; and obtain a network address from the network or from an access point (AP);

wherein the DDCF is configured to allow dynamic sharing of compute resources and network connectivity resources of the device with the neighboring devices in the network, wherein the device is a user device, and the user device is configured to obtain the network address from the AP or from the network, wherein when the user device is not in a subnetwork, the at least one processor is further configured to:

attempt to connect, with the underlying access technologies, to the neighboring devices; and receive a response from one of the neighboring devices to establish connectivity using a protocol under a corresponding radio access technology (RAT).

19. An apparatus for wireless communication, the apparatus being a device, comprising:

a memory; and at least one processor coupled to the memory and configured to:

provide a distributed device cloud function (DDCF) for handling communication for the device with one or more neighboring devices in a network via underlying access technologies; and obtain a network address from the network or from an access point (AP);

wherein the DDCF is configured to allow dynamic sharing of compute resources and network connectivity resources of the device with the neighboring devices in the network, wherein the device is an AP in a subnetwork, and the AP is configured to provide a Network Address Translation (NAT) function to forward a message to the neighboring devices in the subnetwork or to the network.

20. The apparatus of claim 19, wherein the DDCF is configured to:

transmit DDCF broadcast messages to autonomously discover an eligible neighboring subnetwork within a reachable distance; and in response to discovering the eligible neighboring subnetwork, establish a network connection with an AP of the eligible neighboring subnetwork and configure routing with the eligible neighboring subnetwork.

21. The apparatus of claim 18, wherein the DDCF is configured to generate one or more device cloud packet data units (PDUs), each device cloud PDU includes a device cloud protocol header and one or more device cloud messages, and each device cloud message includes a device cloud message header and a device cloud message payload.

* * * * *